(12) United States Patent
Schreiber et al.

(10) Patent No.: US 7,012,409 B2
(45) Date of Patent: Mar. 14, 2006

(54) POWER CONVERTER CIRCUIT AND ASSOCIATED TRIGGERING METHOD FOR GENERATORS WITH DYNAMICALLY VARIABLE POWER OUTPUT

(75) Inventors: Dejan Schreiber, Nürnberg (DE); Heinrich Heilbronner, Stein (DE)

(73) Assignee: SEMIKRON Elektronik GmbH & Co. KG, Nurnberg (DE)

( * ) Notice: Subject to any disclaimer, the term of this patent is extended or adjusted under 35 U.S.C. 154(b) by 0 days.

(21) Appl. No.: 11/042,550

(22) Filed: Jan. 24, 2005

(65) Prior Publication Data

US 2005/0200337 A1     Sep. 15, 2005

(30) Foreign Application Priority Data

Jan. 24, 2004   (DE)   ................. 10 2004 003 657

(51) Int. Cl.
   *G05F 1/70*   (2006.01)
(52) U.S. Cl. ........................................ 323/207
(58) Field of Classification Search ............. 363/34, 363/35; 323/205, 207; 322/28, 44; 307/84, 307/85; 290/44, 45
   See application file for complete search history.

(56) References Cited

U.S. PATENT DOCUMENTS

| | | | |
|---|---|---|---|
| 5,406,470 A * | 4/1995 | Ridley et al. ............... | 363/69 |
| 5,652,485 A | 7/1997 | Spiegel et al. | |
| 5,798,632 A * | 8/1998 | Muljadi ....................... | 322/29 |
| 5,907,192 A * | 5/1999 | Lyons et al. ................. | 290/44 |
| 6,323,624 B1 * | 11/2001 | Henriksen ................... | 322/20 |
| 6,384,567 B1 * | 5/2002 | Maeda ........................ | 318/801 |
| 6,600,240 B1 * | 7/2003 | Mikhail et al. ............... | 307/85 |
| 6,680,856 B1 * | 1/2004 | Schreiber .................... | 363/71 |
| 6,703,718 B1 * | 3/2004 | Calley et al. ................ | 290/44 |
| 6,847,128 B1 * | 1/2005 | Mikhail et al. ............... | 290/44 |

FOREIGN PATENT DOCUMENTS

| | | |
|---|---|---|
| DE | 101 14 075 A1 | 10/2002 |
| WO | WO 2004/008627 A1 | 1/2004 |

OTHER PUBLICATIONS

Applied Designs of Variable Speed Wind Turbines and New Approaches Dejan Schreiber Application Manager, SEMIKRON International Sigmundstrasse 200, 90431 Nuremberg, Germany.

Otto Warneke Einstaz einer doppeltgespeisten Asynchronmaschine in der großen Windenergieanlage Growian pp. 364-367 Anlagen, Systeme, Gerate.

\* cited by examiner

*Primary Examiner*—Adolf Berhane
(74) *Attorney, Agent, or Firm*—Cohen, Pontani, Lieberman & Pavane

(57) ABSTRACT

A power converter circuit and associated triggering method for connecting a three-phase generator to an electrical network. The circuit includes a first direct connection of the generator to the network and a second connection of the generator to the network, through a four-quadrant converter which includes a first power converter, whose alternating voltage terminals are connected to the generator, and a second power converter, whose alternating voltage terminals are connected to the network. The triggering method for power compensation in the event of a short circuit is such that in a first period of time after the short, the second power converter outputs reactive power into the network; in a second period of time, the power converter feeds reactive power back into the network; and in a third period of time, the entire four-quadrant converter controls the gentle restarting, without loading the network with reactive power from the generator.

7 Claims, 1 Drawing Sheet

POWER CONVERTER CIRCUIT AND ASSOCIATED TRIGGERING METHOD FOR GENERATORS WITH DYNAMICALLY VARIABLE POWER OUTPUT

BACKGROUND OF THE INVENTION

1. Field of the Invention

The invention is directed to a power converter circuit for connecting a three-phase generator to an electrical network. Such circuits are used for instance in a wind power system. In that case, a dynamically varying output power of the generator is self-evident because of natural conditions, that is, due to varying wind speeds.

2. Description of the Related Art

The current generated in a generator must be fed into an existing electrical network in a way that is appropriate for the network in terms of voltage, frequency and phase. Typical magnitudes of voltages in such networks range from a few hundred to several tens of kilovolts and frequencies of 50 Hz or 60 Hz.

Prior art wind power systems which vary dynamically over time and include the following technologies.

German Patent Disclosure DE 101 14 075 A1 discloses a complex connection of a generator having a dynamic power output to a medium-voltage electrical network. This generator is connected to a bridge rectifier. The bridge rectifier generates a direct voltage of several kilovolts that is connected to a cascaded arrangement of inverter cells via a direct voltage connection. This extremely flexible power converter circuit can operate quite efficiently, because of the cascaded inverter cells and the upward converters integrated therewith, even when wind speeds vary greatly, causing the attendant output voltages of the generator to vary. Power converter circuits of this kind, however, suffer from a drawback, namely, that favorable, robust, asynchronous machines cannot be used with such circuits, since they require a magnetic rotating field for their excitation. Another disadvantage of such circuits is the relatively high complexity of circuitry, which, for example, precludes installing a circuit of this kind into existing wind power systems, for economic reasons at least.

U.S. Pat. No. 5,652,485 discloses a simple possibility for connecting a wind power system to an electrical network. According to this patent, a four-quadrant inverter is connected directly by its alternating voltage terminals between the output of the generator and the electrical network. Fuzzy logic provides suitable triggering of the four-quadrant inverter. It is understood here that the four-quadrant inverter must have a power capacity equivalent to the maximum power output by the generator. Advantageously, this power capacity is even slightly higher than that of the generator, to assure secure operation.

The simplest possible way of connecting a wind power system to an electrical network is the direct connection of the generator of the wind power system to the electrical network. Asynchronous generators are preferably used, because they are robust. However, such a simple circuit has several disadvantages. At low wind speeds, because generator speed is kept constant, coupling to the electrical network is possible, if at all, only with highly restricted efficiency, because of the inadequate output power. Moreover, with this circuit arrangement, a reactive power compensation that the applicable energy supply business requires cannot be attained in every operating state.

The invention further describes a triggering method of a power converter circuit arrangement for reactive power compensation in the event of a network short circuit. In the event of a network short circuit, if the short circuit is located at a certain distance from the place to be observed, a residual voltage is generally preserved. If this residual voltage also has a defined value, which is dependent on the specifications of the network operator, for instance being 50% of the rated voltage, then an infeed point located there, such as a wind power system, must be capable of feeding reactive power into the electrical network. A wind power system of the construction described above, with direct coupling of the generator to the electrical network, cannot meet this precondition.

SUMMARY OF THE INVENTION

The object of the present invention is, first, to introduce a power converter circuit which expands the direct connection of a generator that outputs dynamically variable power to an electrical network in such a way that the generator speed range within which efficient feeding into the electrical network is possible is extended to lower speeds. This extension may also be incorporated into existing circuits, and reactive power compensation is possible throughout operation.

A second object is to introduce a triggering method which can feed reactive power into the electrical network in the event of a network short circuit.

The inventive power converter circuit for connecting a three-phase generator with an electrical network comprises two individual connections. The first connection is a direct connection of the generator to the electrical network; this connection has a switch in each phase, and this connection may be broken, for example, by opening the switches. The second connection of the generator to the electrical network comprises a four-quadrant converter that in turn comprises first and second power converters, which in turn each comprise three half-bridge circuits for each of two power switches. This four-quadrant converter has at most half the rated output of the generator. The second connection is disposed such that the alternating voltage terminals of the first power converter are connected to the three phases of the generator. The alternating voltage terminals of the second power converter are connected to the three phases of the electrical network. In addition, the two power converters are connected to a common direct current intermediate circuit, and at least one capacitor is connected between the positive and negative terminals of the direct voltage intermediate circuit.

The triggering method for the inventive power converter circuit for reactive power compensation in the event of a network short circuit, in which the remaining network voltage is equal to or greater than 10% of the rated voltage, can be adjusted in three periods of time. The total short circuit phase until at least 80% of the rated voltage is reached again should last three seconds, for example. Directly after the short circuit, the generator, upon direct connection to the electrical network, will run out for lack of network voltage and is disconnected automatically from the electrical network. In the case of connection via the four-quadrant converter, the generator is already not connected directly to the electrical network.

In this first period of time after the short circuit, with the switches between the generator and the electrical network open, the second power converter of the four-quadrant converter furnishes reactive power, by means of the energy stored in the intermediate circuit, into the electrical network via its alternating voltage terminals. During an ensuing second period of time, again with the switches open between the generator and the electrical network, the second power converter withdraws operating power, to compensate for its internal losses, from the electrical network and furnishes reactive power to the electrical network. During this second period of time, the rated voltage as a rule rises again. When 80% of the rated voltage, for instance, is reached, the infeed points are reconnected. In this third period of time, with the switches still open between the generator and the electrical network, the entire four-quadrant converter controls the gentle restarting of the generator, in the process of which no load on the network with reactive power is present.

In the further course of time, depending on the wind speed and the power of the generator attainable therewith, the generator will furnish energy to the electrical network, either continuing to be connected with the electrical network via the four-quadrant converter or being connected directly to it via closed switches.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
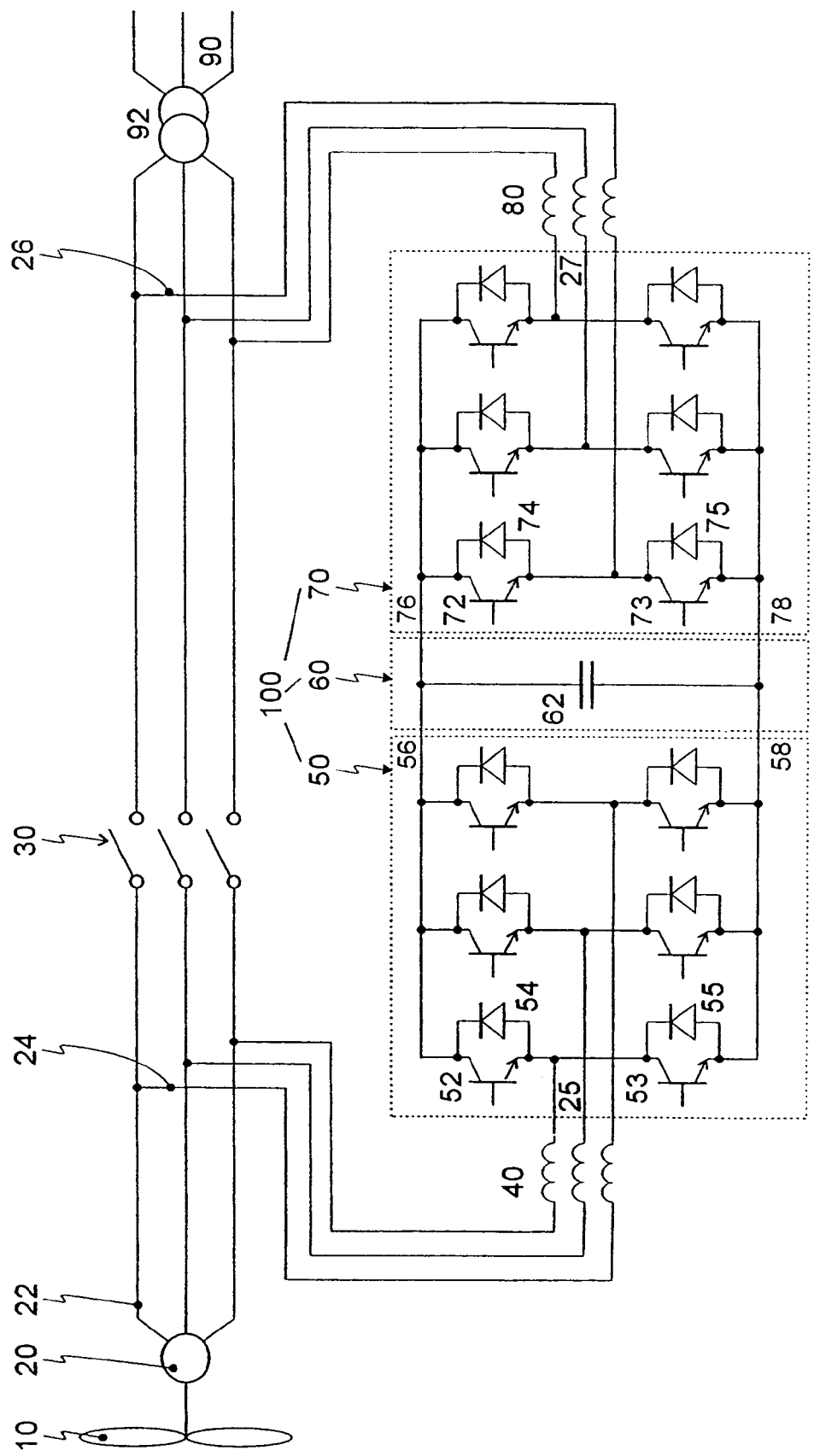
FIG. 1 shows the inventive power converter circuit in a wind power system.

A wind power system is shown in FIG. 1, with a rotor 10 which drives a generator 20 via a gear. Generator 20 is an asynchronous machine, with a rated output voltage of 690 V in accordance with the prior art, and has three output phases 22 which are connected to a medium-voltage electrical network 90 via a transformer 92. To this extent, what is shown corresponds to the prior art of the kind already in frequent use as a wind power system.

For inexpensive expansion of an existing wind power system, or for producing a new, inexpensive wind power system, the circuit shown is expanded in an inventive way with a power converter circuit. This power converter circuit is designed as a four-quadrant converter 100 and comprises one power converter 50, for generator 20 and one power converter 70 for the network 90. Each power converter 50, 70 in turn comprises three half-bridge circuits. These half-bridge circuits in turn each comprise one upper power semiconductor switch 52, 72 and one lower power semiconductor switch 53, 73, each with an antiparallel-connected recovery diode 54, 55, 74, 75. Power converters 50, 70 are connected by their direct current outputs 56, 58, 76, 78 to an energy-storing capacitor 62 by means of a direct current intermediate circuit 60.

For incorporating the four-quadrant converter 100 into the known circuit, the circuit, in the three phases 22 of the connection from generator 20 to electrical network 90, has one switch 30 per phase. Preferably, each switch 30 comprises two antiparallel-connected power semiconductor switches, such as thyristors. Alternating current terminals 25 of generator power converter 50 are each connected to the three phases 22 of the generator 20 via a respective choke 40. Connection 24 of each phase of power converter 50 is located on the generator side of a respective switch 30. Alternating current terminals 27 of network power converter 70 are likewise each connected to the three phases 22 of generator 20 via a respective choke 80, but this connection 26 is located on the network side of a respective switch 30.

At low wind speeds, the first or, in other words, the direct connection of generator 20 to electrical network 90 is broken by switches 30. Under this condition, the energy flows to electrical network 90 via four-quadrant converter 100. Since this connection is designed for only low wind speeds and, thus, low rotary speeds and lesser quantities of energy produced, it is sufficient to design the four-quadrant converter 100 for a maximum of one-half and preferably only one-third the power of generator 20. This has the commercial advantage on the one hand of lower costs for a lower-power four-quadrant converter 100, and on the other hand, simplifies the mechanical installation.

At higher wind speeds, switches 30 are closed; and so current flows directly from generator 20 to electrical network 90. In this case, both power converters 50, 70 of four-quadrant converter 100, by means of suitable triggering, furnish the reactive power required by the network operator to electrical network 90.

Four-quadrant converter 100 of the power converter circuit of the invention serves the purpose of reactive power compensation of electrical network 90 in the event of a network short circuit. Because of the requirements of the network operators, in the prior art the network voltage is at least 80% restored after approximately three seconds. During this time, infeed points, such as wind power systems, must feed reactive power into the electrical network. This is done by network power converter 70 of four-quadrant converter 100, the power converter being triggered by the triggering method of the invention.

In the following description, it will be assumed that generator 20 is connected directly, that is, via closed switches 30, with electrical network 90. After the network short circuit, the voltage of electrical network 90 breaks down, for instance to 20% of the rated value. After a period of approximately 150 ms, the network voltage begins to rise again, until, after roughly three seconds, the rated voltage is again approximately attained.

In the case of a network short circuit, for lack of external excitation, generator 20 furnishes current for only a few periods and is therefore automatically disconnected from electrical network 90 by switches 30. Thus, now only network power converter 70, with its alternating voltage terminals, is connected to electrical network 90 and can contribute to feeding reactive power into electrical network 90. Directly after network short circuit, the network power converter 70 is triggered to furnish reactive power to electrical network 90. In a first period of time after the network short circuit, intermediate circuit 60 serves here as an energy supplier. During this feeding of reactive power, currents above the rated current of the power switches, in this case power transistors 72, 73 (preferably IGBTs or Insulated Gate Bipolar Transistors) can be fed in briefly as needed, as long as a thermal overload, which causes the destruction of the power transistors, is avoided.

In a second period of time, until the network voltage has again attained roughly 80% of the rated voltage, network power converter 70 draws operating power from electrical network 90 and feeds reactive power back into it. The withdrawal of operating power is necessary, since the losses, such as switching losses of the IGBTs 72, 73, within power converter 70 must be compensated for.

After 80% of the rated voltage is attained, generator 20 is reconnected in the third period of time. Four-quadrant converter 100 is now triggered in such a way that a gentle restarting of the generator 20, without loading electrical network 90 with reactive power, is assured. Next, switches 30 are opened, and operation as before the network short circuit is again possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A power converter circuit for connecting a three-phase generator to an electrical network, said generator having a terminal for each of said three phases, said power converter circuit comprising:
   three switches connected between said generator and said electrical network, each of said switches being connected to a respective one of said phases of said generator, and providing a direct connection, when closed, between said generator and said electrical network; and
   a four-quadrant converter providing a second connection between said generator and said electrical network, said four-quadrant converter having a rated output which is no more than one-half of the rated output of said generator, said four-quadrant converter including:
      an intermediate circuit, including a capacitor;
      a first power converter, having three alternating voltage terminals each of which is connected to a respective one of said terminals of said generator and also having at least one direct current terminal connected to said intermediate circuit; and
      a second power converter, having three alternating voltage terminals each of which is connected to said electrical network and also having at least one direct current terminal connected to said intermediate circuit.

2. The power converter circuit according to claim 1, wherein each of said first and second power converters includes three half-bridge circuits, each of said half-bridge circuits having one upper power switch and one lower power switch.

3. The power converter circuit according to claim 2, wherein each of said power switches includes at least one power transistor, and at least one power diode connected in antiparallel to each of said power transistors.

4. The power converter circuit according to claim 1, wherein said switches each comprise two power semiconductor switches connected in antiparallel.

5. The power converter circuit according to claim 4, wherein said power semiconductor switches are thyristors.

6. A triggering method for a power converter circuit for connecting a three-phase generator to an electrical network, said generator having a terminal for each of said three phases, said power converter circuit comprising:
   three switches connected between said generator and said electrical network, each of said three switches being connected to one of said phases of said generator, and providing a direct connection, when closed, between said generator and said electrical network; and
   a four-quadrant converter providing a second connection between said generator and said electrical network, said four-quadrant converter having a rated output which is no more than one-half of the rated output of said generator, said four-quadrant converter including:
      an intermediate circuit, having a capacitor, for storing energy,
      a first power converter, having three alternating voltage terminals each of which is connected to a respective one of said terminals of said generator and also having at least one direct current terminal connected to said intermediate circuit, and
      a second power converter, having three alternating voltage terminals each of which is connected to said electrical network and also having at least one direct current terminal connected to said intermediate circuit;
   wherein said power converter circuit is capable of providing reactive power compensation in the event of a short circuit in said electrical network, during which short circuit the remaining network voltage is equal to or greater than 10% of the rated voltage,
   said method comprising the steps of:
   during a first period of time after the short circuit, in which said switches are open because of said network short circuit, said second power converter outputs reactive power from the energy stored in said intermediate circuit into said electrical network via said alternating voltage terminals of said second power converter;
   during a second period of time, with said switches continuing to be open, said second power converter feeds reactive power back into said electrical network; and
   during a third period of time, with said switches being open, said four-quadrant converter controls the gentle restarting of said generator and thereby keeps the network load with minimal reactive power or prevents it, until said generator again furnishes energy to said electrical network either continuing to be connected to said electrical network via said four-quadrant converter or being connected directly to said electrical network through the closure of said switches.

7. The triggering method according to claim 6, wherein within said first period of time, said power switches of said power converters are loaded beyond their rated loading, provided that this is possible without destruction of said power switches.

* * * * *